United States Patent
Beauregard

(10) Patent No.: US 10,501,108 B2
(45) Date of Patent: Dec. 10, 2019

(54) STEERING WHEEL FOR A VEHICLE MOVABLE BETWEEN A DEPLOYED POSITION AND A RETRACTED POSITION

(71) Applicant: FAURECIA INTERIEUR INDUSTRIE, Nanterre (FR)

(72) Inventor: Julien Beauregard, Mesnil en Thelle (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 15 days.

(21) Appl. No.: 15/982,685

(22) Filed: May 17, 2018

(65) Prior Publication Data

US 2018/0334183 A1 Nov. 22, 2018

(30) Foreign Application Priority Data

May 19, 2017 (FR) ...................................... 17 54448

(51) Int. Cl.
- *B62D 1/183* (2006.01)
- *B62D 1/06* (2006.01)
- *B62D 1/04* (2006.01)

(52) U.S. Cl.
CPC .................. *B62D 1/06* (2013.01); *B62D 1/04* (2013.01); *B62D 1/183* (2013.01)

(58) Field of Classification Search
CPC ............. B62D 1/06; B62D 1/04; B62D 1/183
USPC .................................................. 74/493, 552
See application file for complete search history.

(56) References Cited

U.S. PATENT DOCUMENTS

| 1,847,209 | A | * | 3/1932 | Bolinas, Jr. | ......... B60R 25/0224 74/555 |
| 2,155,123 | A | * | 4/1939 | Gerardy | .................... B62D 1/04 74/555 |
| 2,326,131 | A | * | 8/1943 | Eschelbacher | ........... B62D 1/04 74/493 |
| 2007/0295151 | A1 | * | 12/2007 | Kentor | ..................... B62D 1/06 74/552 |
| 2016/0325662 | A1 | * | 11/2016 | Nash | ...................... B60N 3/005 |
| 2017/0113589 | A1 | * | 4/2017 | Riefe | ..................... B60N 3/005 |

(Continued)

FOREIGN PATENT DOCUMENTS

| CN | 106627724 A | 5/2017 | |
| FR | 2779695 A1 * | 12/1999 | ............. B60K 35/00 |

(Continued)

OTHER PUBLICATIONS

French Preliminary Search Report for application No. FR1754448, dated Feb. 7, 2018, 2 pages.

*Primary Examiner* — Joseph M Rocca
*Assistant Examiner* — Hilary L Johns
(74) *Attorney, Agent, or Firm* — Reising Ethington P.C.

(57) ABSTRACT

A steering wheel having a body rotatable around a steering axis (D), a first gripping element and a second gripping element, the first gripping element being movable between a deployed position, in which the first and second gripping elements extend on either side of the body, and a retracted position, in which the first gripping element is folded down against the second gripping element. The second gripping element is translatable relative to the body at least in a first direction substantially parallel to the steering axis (D) between the deployed position and the retracted position so as to free a space for the first gripping element in the retracted position.

10 Claims, 4 Drawing Sheets

(56) References Cited

U.S. PATENT DOCUMENTS

2017/0297606 A1* 10/2017 Kim ....................... B62D 1/181
2018/0154921 A1*  6/2018 Bonello .................. B62D 1/06

FOREIGN PATENT DOCUMENTS

| | | | |
|---|---|---|---|
| FR | 2779695 A1 | 12/1999 | |
| FR | 2861657 A1 * | 5/2005 | ......... B60R 11/0235 |
| FR | 3066463 A1 * | 11/2018 | ............... B62D 1/04 |
| JP | S5830867 A | 2/1983 | |
| JP | S61205865 U | 12/1986 | |
| WO | WO-2017060149 A1 * | 4/2017 | |
| WO | WO2017060149 A1 | 4/2017 | |

* cited by examiner

STEERING WHEEL FOR A VEHICLE MOVABLE BETWEEN A DEPLOYED POSITION AND A RETRACTED POSITION

TECHNICAL FIELD

The present invention relates to a steering wheel for a vehicle, of the type comprising a body rotatable around a steering axis, a first gripping element and a second gripping element, the first gripping element being movable relative to the body between a deployed position, in which the first and second gripping elements extend on either side of the body of this steering axis, and a retracted position, in which the first gripping element is folded down against the second gripping element, the first gripping element rotating relative to the body around a rotation axis substantially perpendicular to the steering axis between the deployed position and the retracted position.

The invention also relates to a vehicle dashboard comprising such a steering wheel.

BACKGROUND

In the context of so-called "autonomous" vehicles, in which driver intervention is reduced, or even practically nonexistent, to drive the vehicle, the arrangement of the passenger compartment may be configurable by modifying the orientation and/or the position of the seats, since they no longer necessarily need to face the road. It is thus for example possible to provide for turning the seats toward one another and/or placing the seats in elongated, more comfortable positions for the vehicle's passengers.

Such vehicles are generally configurable in a manual driving configuration, in which a driver can drive the vehicle using a steering wheel, and an automatic driving configuration, in which the driver does not intervene and therefore does not use the steering wheel.

It may therefore be advantageous to provide a steering wheel that is also configurable so that the steering wheel is easily accessible in the manual driving configuration and so as to free space in front of the driver in the automatic driving configuration when the steering wheel is not used.

Document FR 2,779,695 describes a steering wheel comprising two gripping elements making it possible to free a space below the steering wheel by pivoting one of the gripping elements around the body of the steering wheel to fold it down on the other in a retracted position.

However, in the retracted position, the freed space is not optimized in the front-back direction of the vehicle. Indeed, the gripping element folded down against the other occupies a space extending behind the other gripping element, which remains fixed, which increases the bulk of the steering wheel in the front-back direction. Furthermore, the aesthetic aspect of the steering wheel is not satisfactory, since the gripping element folded down on the other protrudes from the body of the steering wheel in the retracted position.

SUMMARY

One aim of the invention is to offset these drawbacks by proposing a steering wheel that can be placed in a retracted position in which the saved space is optimized and in which the steering wheel has a satisfactory appearance.

To that end, the invention relates to a steering wheel of the aforementioned type, in which the second gripping element is translatable relative to the body at least in a first direction substantially parallel to the steering axis between the deployed position and the retracted position so as to free a space for the first gripping element in the retracted position.

By moving the second gripping element in the first direction during the passage of the first gripping element from the deployed position to the retracted position, a space is freed opposite the second gripping element in the first direction. Thus, the second gripping element retracts and leaves its space for the first gripping element, which makes it possible not to increase the bulk of the steering wheel in the first direction in the retracted position. Thus, in the retracted position, the steering wheel according to the invention makes it possible to free the space occupied by the first gripping element in the deployed position while not increasing the bulk of the steering wheel in the first direction. Furthermore, the appearance of the steering wheel in the retracted position is satisfactory, since the gripping elements are fitted in the space occupied by the body of the wheel in the first direction.

According to other aspects of the steering wheel according to the invention, considered alone or according to any technically possible combination:

- the second gripping element is further movable relative to the body in translation in a second direction substantially perpendicular to the first direction between the deployed position and the retracted position;
- the second gripping element moves in translation in the first direction, then in the second direction when the first gripping element goes from the deployed position to the retracted position;
- the second gripping element is mounted sliding in at least one rail of the body, said rail extending in the movement direction(s) of the second gripping element between the deployed and retracted positions;
- the first and second gripping elements are secured in rotation with the body around the steering axis in the deployed position;
- the first and second gripping elements are connected to the body by fastening points, said fastening points being substantially aligned in the direction of the steering axis in the retracted position;
- the body comprises a fixed part and at least one moving part, the moving part being translatable relative to the fixed part in a direction substantially parallel to the steering axis between a retracted position, in which the fixed part and the moving part overlap over a first length, and a deployed position in which the fixed part and the moving part overlap over a second length smaller than the first length; and
- the first and second gripping elements are mounted on the moving part, the first and second gripping elements being in the retracted position when the moving part is in the retracted position and in the deployed position when the moving part is in the deployed position.

The invention also relates to a dashboard comprising a steering wheel as described above, the dashboard being able to be positioned in a manual driving configuration, in which the first and second gripping elements are in the deployed position, and an automatic driving configuration, in which the first and second gripping elements are in the retracted position.

According to another feature of the dashboard according to the invention, the distance separating the first and second gripping elements of an outer surface of the dashboard in the retracted position is smaller than said distance in the deployed position.

BRIEF DESCRIPTION OF THE DRAWINGS

Other aspects and advantages of the invention will appear upon reading the following description, provided as an example, and done in reference to the appended drawings, in which.

DETAILED DESCRIPTION

Figure 1:
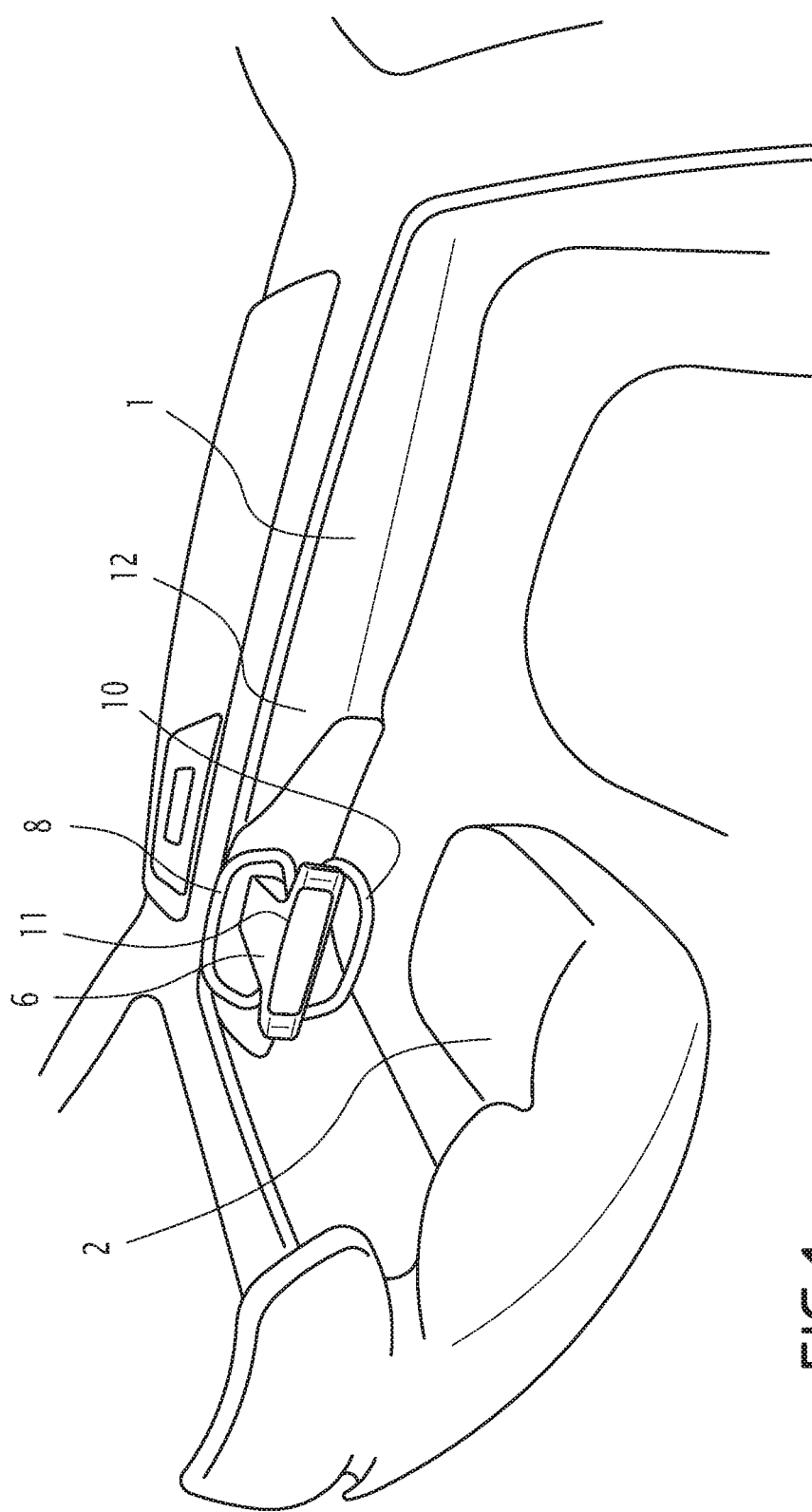
FIG. 1 is a schematic perspective illustration of a vehicle interior comprising a dashboard according to the invention in a manual driving configuration.

In reference to FIGS. 1 and 2, a vehicle interior, for example a motor vehicle, and more particularly the front part of this vehicle, will be described. The vehicle interior comprises a dashboard 1 and at least one seat 2 extending opposite the dashboard 1. The seat 2 is a driver's seat intended to accommodate the driver of the vehicle. The invention for example applies to an autonomous vehicle arranged to be able to be placed in a manual driving configuration (FIG. 1), in which the occupant of the seat 2 steers the vehicle, in particular using a steering wheel 4 extending from the dashboard 1 toward the seat 2, and in an autonomous driving configuration (FIG. 2), in which the vehicle is steered automatically by a command system of the vehicle and in which the occupant of the seat 2 is not required to intervene.

To that end, the steering wheel 4 can be placed in a deployed position (FIGS. 1 and 3), in which the steering wheel 4 is accessible to the driver, and a retracted position (FIGS. 2 and 5), in which at least part of the space occupied by the steering wheel 4 in the deployed position is freed.

The steering wheel 4 comprises a body 6, a first gripping element 8 and a second gripping element 10.

The body 6 extends around the steering column of the vehicle along a steering axis D extending tilted relative to the front-back direction of the vehicle. The body 6 makes it possible to conceal the steering column from the passenger compartment of the vehicle and to house functional elements of the steering system of the vehicle. The body 6 also makes it possible to give the steering wheel 4 a pleasant appearance. The body 6 protrudes from the outer face 12 of the dashboard 1 opposite the seat 2. The body 6 for example has a substantially parallelepiped shape comprising a lower wall 14, an upper wall 16 extending on either side of the steering axis D in the elevation direction of the vehicle and two side walls 18 extending on either side of the steering axis D in the direction of the width of the vehicle and connecting the lower 14 and upper 16 walls to each other. Alternatively, the body 6 could assume the form of a cylinder of revolution or the like.

Figure 4:
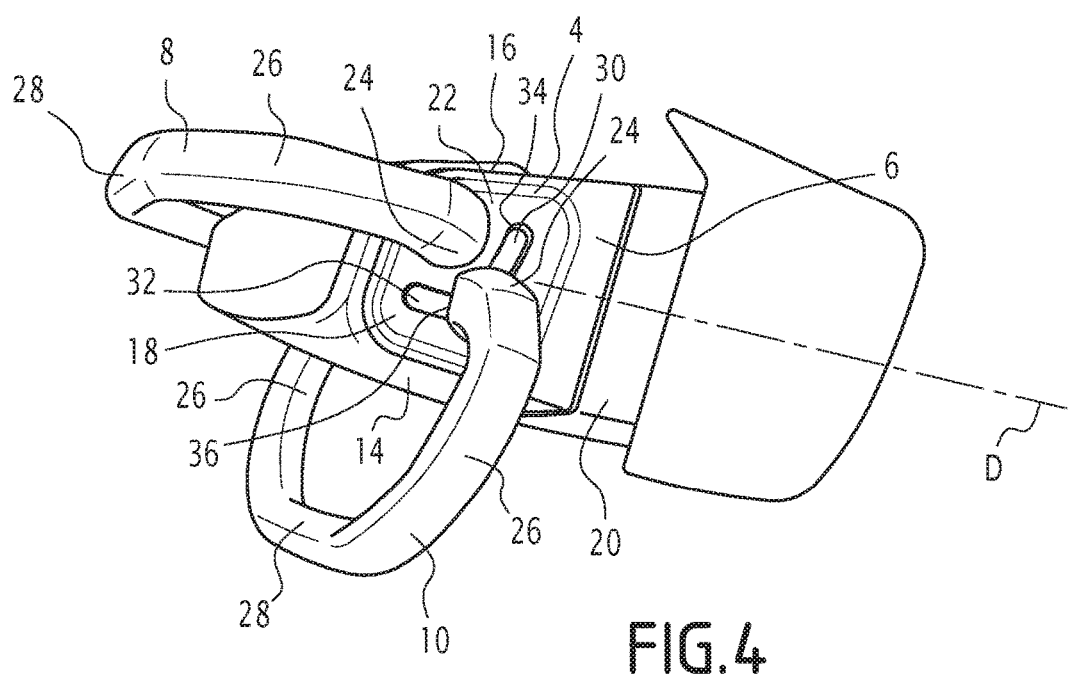
FIG. 4 is a schematic illustration of the steering wheel of FIG. 3, in an intermediate position between the deployed position and the retracted position.
Figure 5:
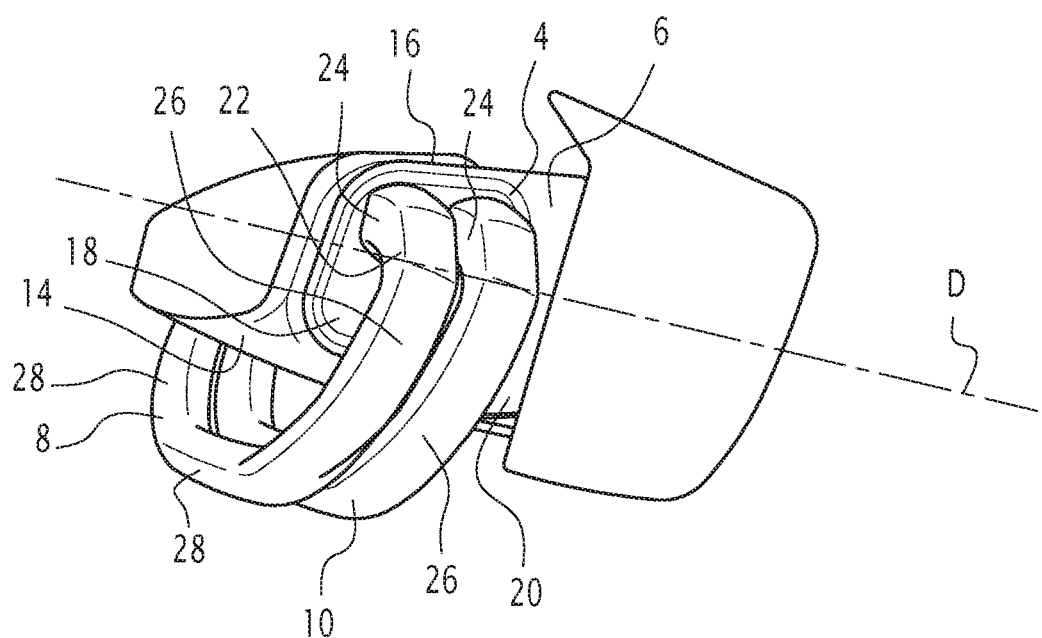
FIG. 5 is a schematic illustration of the steering wheel of FIG. 3, in a retracted position.

According to one embodiment, the body 6 is telescoping so as to make it possible to bring the steering wheel 4 closer to or further from the occupant of the seat 2, depending on the position in which the steering wheel 4 is placed. To that end, the body 6 for example comprises a fixed part 20 and a moving part 22, movable relative to the fixed part 20 in a direction substantially parallel to the steering axis D between a deployed position (FIGS. 1 and 3) and a retracted position (FIGS. 2 and 5). The moving part 22 is for example fitted on or inserted in the fixed part 20 and is able to slide relative to the fixed part 20 in a direction substantially parallel to the steering axis D such that the overlap length between the fixed part 20 and the moving part 22 is variable. Thus, in the retracted position, the fixed part 20 and the moving part 22 overlap over a first length, and in the deployed position, the fixed part 20 and the moving part 22 overlap over a second length smaller than the first length. In other words, in the deployed position, the moving part 22 is brought closer to the seat 2 and in the retracted position, the moving part 22 is moved away from the seat 2, while being fitted on or inserted in the fixed part 20 over a greater length in the direction parallel to the steering axis D, as can be seen by comparing FIGS. 3 to 5. According to one embodiment, the body 6 may comprise several moving parts movable relative to one another so as to form a telescoping body 6 over a greater travel.

The first and second gripping elements 8, 10 are mounted movably on the body 6. In the case of a telescoping body 6, the first and second gripping elements 8, 10 are mounted on the moving part 22 and, when the body 6 comprises several moving parts, on the moving part forming the end of the body 6 opposite the seat 2.

Each gripping element 8, 10 for example assumes the form of a hoop extending between two fastening points 24 to the body 6. The fastening points 24 are fixed to the body 6 on either side thereof, for example on the two side walls 18. Each gripping element 8, 10 for example comprises a side branch 26 extending from each fastening point 24, the side branches 26 being connected to each other at their end opposite their fastening point 24 by a main branch 28 extending in the direction of the width of the vehicle.

The first and second gripping elements 8, 10 are movable relative to the body 6 between a deployed position (FIG. 3) and a retracted position (FIG. 5).

Figure 3:
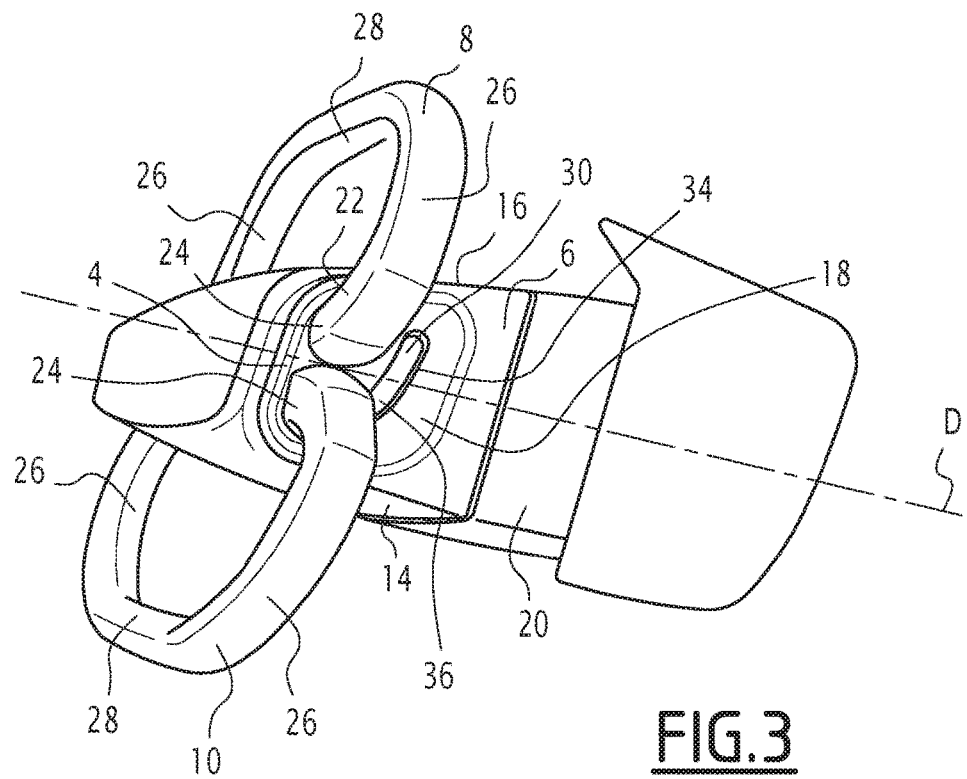
FIG. 3 is a schematic perspective illustration of a steering wheel according to the invention, in a deployed position.

In the deployed position, the first and second gripping elements 8, 10 extend on either side of the body 6, for example above and below the body 6 in the elevation direction of the vehicle. Thus, the first gripping element 8 forms an upper gripping element whose main branch 28 extends opposite and substantially parallel to the upper wall 16 of the body 6, as shown in FIG. 3. The second gripping element 10 forms a lower gripping element whose main branch extends opposite and substantially parallel to the lower wall 14 of the body 6, as shown in FIG. 3.

Alternatively, the first and second gripping elements 8, 10 could extend to the right and left of the body 6 such that their main branch 28 extends substantially parallel to a side wall 18. According to this embodiment, the fastening points 24 of the gripping elements are fixed to the body 6 on the lower 14 and upper 16 walls.

In the deployed position, the first and second gripping elements 8, 10 are secured in rotation with the body 6, which is rotatable around the steering axis D. Thus, when the user holds the gripping elements 8, 10, he can direct the vehicle by turning the steering wheel 4 in its deployed position, which drives a corresponding rotation of the steering column. Thus, the steering wheel 4 for example comprises a locking element for locking the gripping elements 8, 10 in their deployed position.

To go from the deployed position to the retracted position, the first gripping element 8 is rotatable relative to the body 6 around a rotation axis substantially perpendicular to the steering axis D. More particularly, the rotation axis goes through the two fastening points 24 for fastening the first gripping element 8 to the body 6, each fastening point 24 thus being articulated on the face of the body 6 to which the fastening point 24 is fixed. In the case of a first gripping element 8 forming an upper gripping element, the rotation axis extends in the direction of the width of the vehicle. The first gripping element 8 can thus rotate around the body 6 to go to the lower side of the body 6 and be folded down against the second gripping element 10, as shown in FIGS. 4 and 5. In the case of a first gripping element 8 for example extending to the left of the body 6, the passage toward the retracted position is done by causing the gripping element 8 to go to the right side of the body 6, the rotation axis then extending in the elevation direction of the vehicle.

In the retracted position, the first gripping element 8 thus extends on the same side of the body as the second gripping element 10, as shown in FIG. 5.

During the passage from the deployed position to the retracted position, the second gripping element 10 moves in translation relative to the body 6 at least in a first direction substantially parallel to the steering axis D so as to come closer to the outer surface 12 of the dashboard 1. In other words, the second gripping element 10 retracts toward the dashboard 1 in order to free a space for the first gripping element 8 during the passage from the deployed position to the retracted position, as shown in FIGS. 4 and 5. To that end, the fastening points 24 of the second gripping element 10 are mounted on rails 26, 30 extending in the faces of the body 6 to which the fastening points 24 are fixed, i.e., the side faces 18 according to the embodiment shown in the figures. Each rail 30 extends in the direction in which the second gripping element 10 moves between the deployed and retracted positions.

According to the embodiment shown in the figures, the second gripping element 10 further moves in a second direction substantially perpendicular to the first direction. According to this embodiment, when the second gripping element 10 moves from the deployed position to the retracted position, the second gripping element 10 first moves in the first direction, then in the second direction. Thus, the rail 30 comprises a first segment 32 extending in the first direction and a second segment 34 extending in the second direction. In the deployed position, the fastening elements 24 of the second gripping element extend at one end of the first segments 32, opposite the junction 36 between the first segment 32 and the second segment 34 and, in the retracted position, the fastening elements 24 of the second gripping element 10 extend at one end of the second segments 34, opposite the junction 36 between the first segment 32 and the second segment 34. Thus, during the passage from the deployed position to the retracted position, the fastening elements 24 of the second gripping element 10 move first in the first segments 32, pass through the junctions 36, then move in the second segments 34, as shown in FIGS. 3 to 5.

According to one example, the shape of the rails 30 is such that, in the deployed position, the fastening elements 24 of the first and second fastening elements 8, 10 are substantially aligned in the elevation direction of the vehicle, as shown in FIG. 3 and, in the retracted position, the fastening elements 24 of the first and second fastening elements 8, 10 are substantially aligned in the direction of the steering axis D or in the front-back direction of the vehicle, as shown in FIG. 5. Such an embodiment makes it possible to have a satisfactory aesthetic effect, both in the deployed position and in the retracted position.

In the retracted position, the first and second gripping elements 8, 10 are therefore folded down against each other, the first gripping element 8 substantially occupying the space that is occupied by the second gripping element 10 in the deployed position, while the second gripping element 10 is retracted toward the dashboard 1. This makes it possible not to increase the bulk of the steering wheel 4 in the front-back direction of the vehicle. On the contrary, this bulk may be further reduced by providing a telescoping body 6 as previously described. In any case, in the retracted position, the first and second gripping elements 8, 10 are fitted in the space extending on one side of the body 6 without protruding from the body 6 in the front-back direction, as shown in FIG. 5.

The movements of the moving part(s) 22 of the body 6, the first gripping element 8 and the second gripping element 10 between the deployed and retracted positions are for example synchronized so that the deployment and retraction kinetics of the steering wheel 4 are visually pleasing to the occupants of the vehicle. These movements are for example commanded by a control device of the vehicle that may also be arranged to control other functions of the vehicle, such as movements of the seat 2 in order to obtain a coordinated movement of the seat 2 and the steering wheel 4 between the different configurations of the vehicle, as will now be described.

In a manual driving configuration of the vehicle, shown in FIG. 1, the steering wheel 4 is in its deployed position, i.e., the first and second gripping elements 8, 10 and the body 6 are in their deployed position, and the seat 2 is for example in an upright position. In this configuration, a driver seated in the seat 2 naturally finds the steering wheel 4 in front of him and can steer the vehicle by manipulating it.

Figure 2:
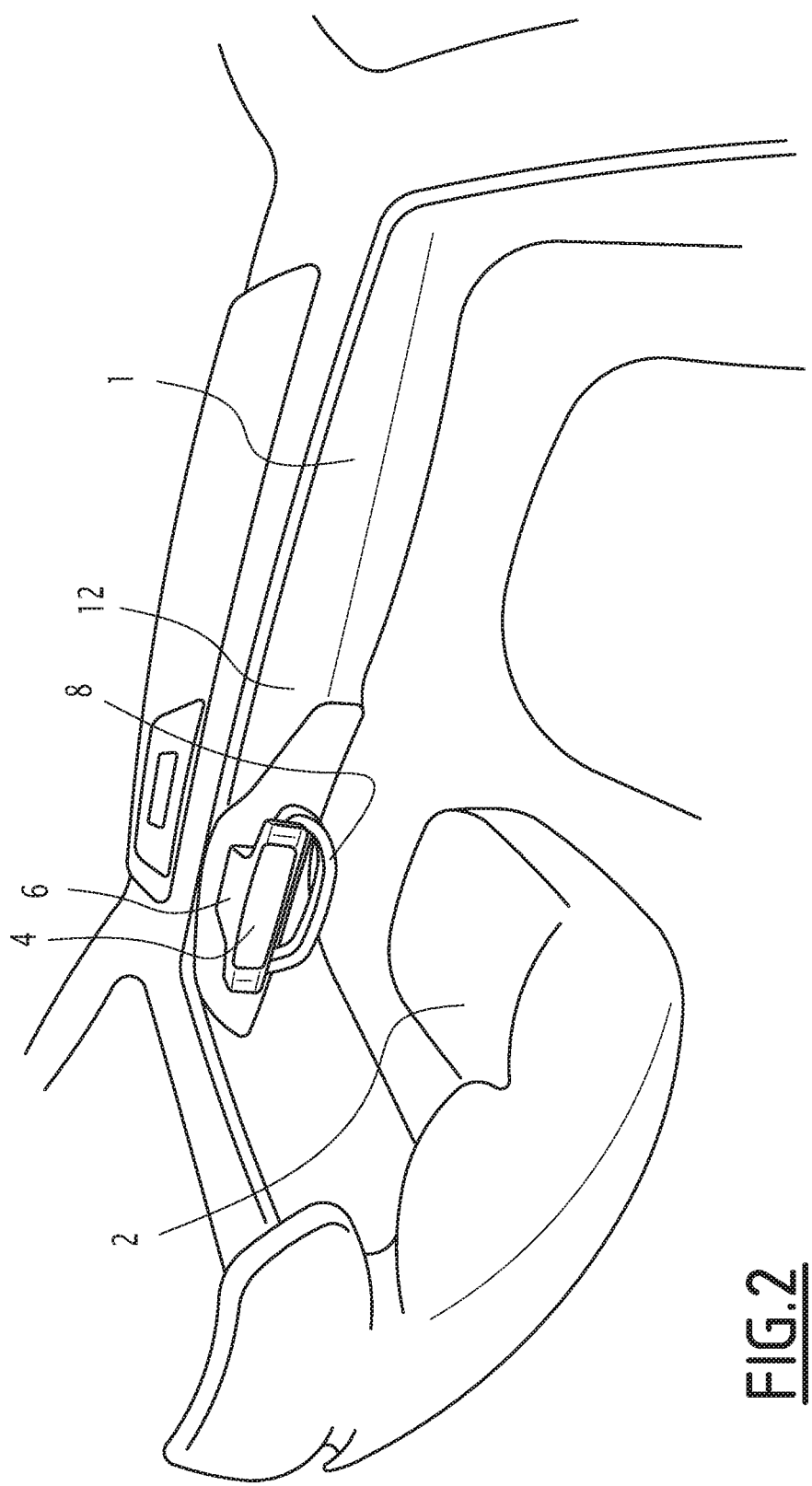
FIG. 2 is a schematic illustration of the vehicle interior of FIG. 1, the dashboard being in an automatic driving configuration.

When the vehicle enters an automatic driving configuration, shown in FIG. 2, the steering wheel moves to its retracted position, i.e., the first and second gripping elements 8, 10 and the body 6 move, for example in a synchronized manner, toward the retracted position. At the same time, the seat 2 can for example move toward an elongated position or a position turned toward the other seats.

In the retracted position, the distance separating the first and second gripping elements 8, 10 from the outer surface 12 of the dashboard 1 is reduced relative to this same distance in the deployed position, which makes it possible to free a space in front of the driver when he does not need to use the steering wheel 4. Furthermore, in the embodiment in which the first gripping element 8 forms an upper gripping element, having it go to the lower side of the body 6 in the retracted position makes it possible to free the driver's field of vision above the body 6 so as, for example, to increase his field of vision through the windshield or to make visible a screen or the like extending in front of the steering wheel 4.

The description has been done in reference to a so-called "autonomous" vehicle, but it is understood that the invention could apply to a traditional vehicle, in which the steering wheel could enter the retracted position for example when the vehicle is stopped, making it easier to enter or exit the vehicle, etc.

The invention claimed is:

1. A steering wheel for a vehicle, comprising a body rotatable around a steering axis, a first gripping element and a second gripping element, the first gripping element being movable relative to the body between a deployed position, in which the first and second gripping elements extend on either side of the body of the steering axis, and a retracted position, in which the first gripping element is folded down against the second gripping element, the first gripping element rotating relative to the body around a rotation axis substantially perpendicular to the steering axis between the deployed position and the retracted position, wherein the second gripping element is translatable relative to the body at least in a first direction substantially parallel to the steering axis between the deployed position and the retracted position so as to clear a space for the first gripping element in the retracted position.

2. The steering wheel according to claim 1, wherein the second gripping element is further movable relative to the body in translation in a second direction substantially perpendicular to the first direction between the deployed position and the retracted position.

3. The steering wheel according to claim 2, wherein the second gripping element moves in translation in the first direction, then in the second direction when the first gripping element goes from the deployed position to the retracted position.

4. The steering wheel according to claim 1, wherein the second gripping element is mounted sliding in at least one rail of the body, said rail extending in the movement direction(s) of the second gripping element between the deployed and retracted positions.

5. The steering wheel according to claim 1, wherein the first and second gripping elements are secured in rotation with the body around the steering axis in the deployed position.

6. The steering wheel according to claim 1, wherein the first and second gripping elements are connected to the body by fastening points, said fastening points being substantially aligned in the direction of the steering axis in the retracted position.

7. The steering wheel according to claim 1, wherein the body comprises a fixed part and at least one moving part, the moving part being translatable relative to the fixed part in a direction substantially parallel to the steering axis between a retracted position, in which the fixed part and the moving part overlap over a first length, and a deployed position in which the fixed part and the moving part overlap over a second length smaller than the first length.

8. The steering wheel according to claim 7, wherein the first and second gripping elements are mounted on the moving part, the first and second gripping elements being in the retracted position when the moving part is in the retracted position and in the deployed position when the moving part is in the deployed position.

9. A vehicle dashboard that includes the steering wheel of claim 1, the dashboard being able to be positioned in a manual driving configuration, in which the first and second gripping elements are in the deployed position, and an automatic driving configuration, in which the first and second gripping elements are in the retracted position.

10. The dashboard according to claim 9, wherein the body comprises a fixed part and at least one moving part, the moving part being translatable relative to the fixed part in a direction substantially parallel to the steering axis between a retracted position, in which the fixed part and the moving part overlap over a first length, and a deployed position in which the fixed part and the moving part overlap over a second length smaller than the first length, wherein the first and second gripping elements are mounted on the moving part, the first and second gripping elements being in the retracted position when the moving part is in the retracted position and in the deployed position when the moving part is in the deployed position, wherein the distance separating the first and second gripping elements of an outer surface of the dashboard in the retracted position is smaller than said distance in the deployed position.

* * * * *